(12) United States Patent
Enzinna (10) Patent No.: US 6,378,222 B1
(45) Date of Patent: Apr. 30, 2002

(54) FILM BELT POSITION INDICATOR WITH MISALIGNMENT COMPENSATION MEANS

(75) Inventor: Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 09/652,246

(22) Filed: Aug. 31, 2000

(51) Int. Cl.[7] .................................................. G01B 5/00
(52) U.S. Cl. ............................ 33/645; 33/613; 33/1 PT
(58) Field of Search ........................... 33/645, 613, 1 N, 33/1 PT, 600, 655, 656

(56) References Cited

U.S. PATENT DOCUMENTS

| | | | | |
|---|---|---|---|---|
| 5,259,584 A | * | 11/1993 | Wainwright | ................ 33/1 N |
| 5,746,005 A | * | 5/1998 | Steinberg | ..................... 33/1 N |
| 6,082,009 A | * | 7/2000 | Tillis et al. | ................... 33/1 N |
| 6,114,820 A | * | 9/2000 | Nishigaya | ................... 33/1 PT |
| 6,256,893 B1 | * | 7/2001 | Forborgen | .................... 33/1 N |

* cited by examiner

*Primary Examiner*—Christopher W. Fulton
(74) *Attorney, Agent, or Firm*—Patrick M. Griffin (57) ABSTRACT

A potentiometer position indicator for an automotive HVAC system belt drive has a means that passively realigns the turning wiper and fixed ring of the potentiometer if the potentiometer wiper becomes misaligned relative to the belt. A slip clutch interposed between the final gear of a gear reduction mechanism and the potentiometer wiper contacts a hard stop and is shifted back to an aligned position as the belt is shifted to either of its limit positions, thereby automatically realigning the two.

3 Claims, 8 Drawing Sheets

FILM BELT POSITION INDICATOR WITH MISALIGNMENT COMPENSATION MEANS

TECHNICAL FIELD

This invention relates to air conditioning and ventilation systems in general, and specifically to a drive for a flexible film belt damper with a position indicator that can be easily aligned to the belt.

BACKGROUND OF THE INVENTION

A relatively recent trend in automotive air conditioning and ventilation systems has been the replacement of conventional, swinging flapper door valves with flexible film belts. A run of flexible film is rolled back and forth between a take up roller and a drive roller, and a window in the belt covers and uncovers an air passage within a housing of the system, allowing air through in direct proportion to the degree that the opening is uncovered. This promises more predictable control of airflow rates, as well as a potentially more compact system.

One advantage of the conventional, swinging flapper door is that it swings over less than a full turn, and it is therefore relatively easy to monitor its position. One known device is a potentiometer, in which a wiper that turns with the flapper door shaft wipes along an annular ring, back and forth, creating a changing resistance. The potentiometer works only over less that a full 360 degrees, but that comports with the operation of a swinging flapper door. The rollers that run the film belt must move through multiple turns, however. Therefore, if a potentiometer is to be used as a position indicator, a series of reduction gears must be used to step down the multiple turns of the belt roller into a single turn of the potentiometer. While that can be easily done, the potential exists for misaligning the potentiometer relative to the drive mechanism when the various gears are removed and replaced, such as during servicing. This misaligning will not be easily visible to the operator, but will throw off the position indicating function of the potentiometer.

SUMMARY OF THE INVENTION

The subject invention provides a means for re aligning the potentiometer if it becomes misaligned, which is simple and compact and works in conjunction with the basic, normal operation of the film belt.

In the preferred embodiment disclosed, the belt runs between normal left and right limit positions. Reduction gears operable between one of the belt rollers and the potentiometer translate the multiple turns of the belt roller into just less than a full turn of the potentiometer wiper. Therefore, the limit positions of the belt correspond to limit positions of the potentiometer wiper on the ring.

The potentiometer wiper is not directly turned by the reduction gear mechanism, however. Instead, a slip clutch is superimposed, so as to indirectly drive the potentiometer wiper. A tab extends radially from the potentiometer wiper, and engages one of two hard stops on the HVAC case when the potentiometer wiper is in either of its limit positions. If the potentiometer and the gear mechanism are properly aligned, the engagement of the hard stops will correspond to the belt also being at its limit positions. However, if the potentiometer and gear mechanism are misaligned, in either direction, the tab on the potentiometer wiper will hit one of the hard stops before the belt has reached its limit position. The belt will continue to roll past that point, but the slip clutch will shift as the tab is pushed against the hard stop, thereby allowing potentiometer wiper to stay at its limit position until the belt reaches its limit position. At that point, the limit positions of the potentiometer and belt will again properly correspond.

BRIEF DESCRIPTION OF THE DRAWINGS

These and other features of the invention will appear from the following written description, and from the drawings, in which.

DESCRIPTION OF THE PREFERRED EMBODIMENT

Figure 1:
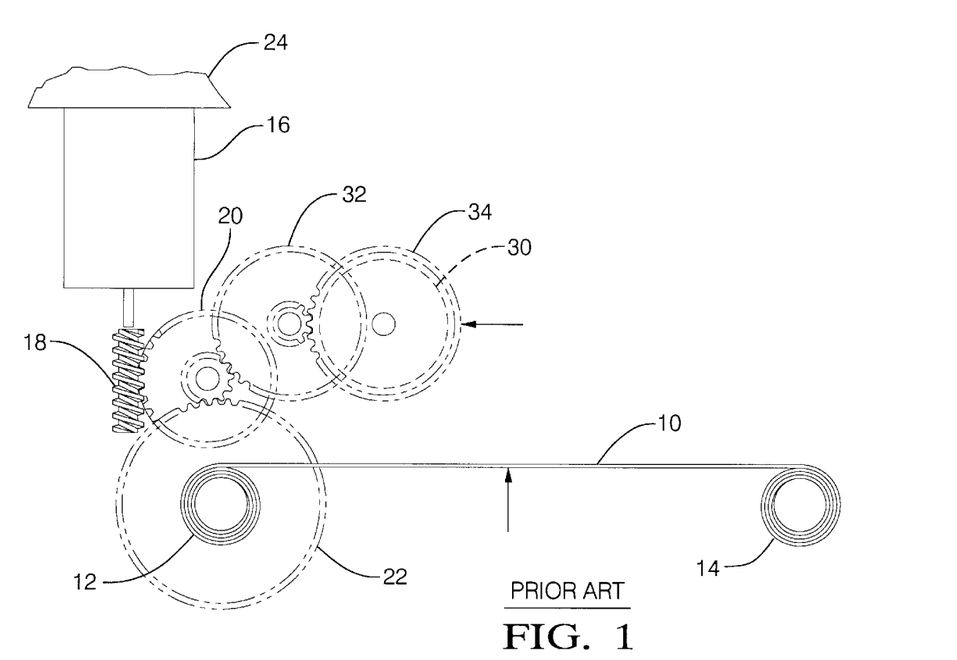
FIG. 1 is a schematic view of a prior art film belt and potentiometer belt position indicator, showing the two in proper alignment, with both the potentiometer and belt approximately midway between their limit positions, as indicated by arrows on the two.

Referring first to FIG. 1, a prior art film belt drive and position indicator includes a length of flexible film belt 10 that is wound back and forth between a drive roller 12 and a take up roller 14. Take up roller 14 includes a constant, passive tensioning means, such as a spring, that continually pulls belt 10 taught. Drive roller 12 is actively turned back and forth by a motor 16, which turns a worm gear 18 that turns a compound gear 20. Gear 20 turns a toothed wheel 22 that directly turns drive roller 12. Motor 16 is fixed to the HVAC housing or case 24, which also provides the structural foundation for the axes of the rollers 12 and 14, as well as the axes of the various other gears and fixed structures described below. As belt 10 is wound back and forth, onto and off of the rollers 12 and 14, it will reach natural "limit" positions when it is wound all onto one of the rollers 12 or 14, and all off of the other. It is relatively easy to detect these limit positions of belt 10, since the belt 10 will be strongly resist any further winding back and forth. In between the limit positions, it is necessary to know the position of belt 10, also, and some means must be provided for detecting it accurately.

Figure 4:
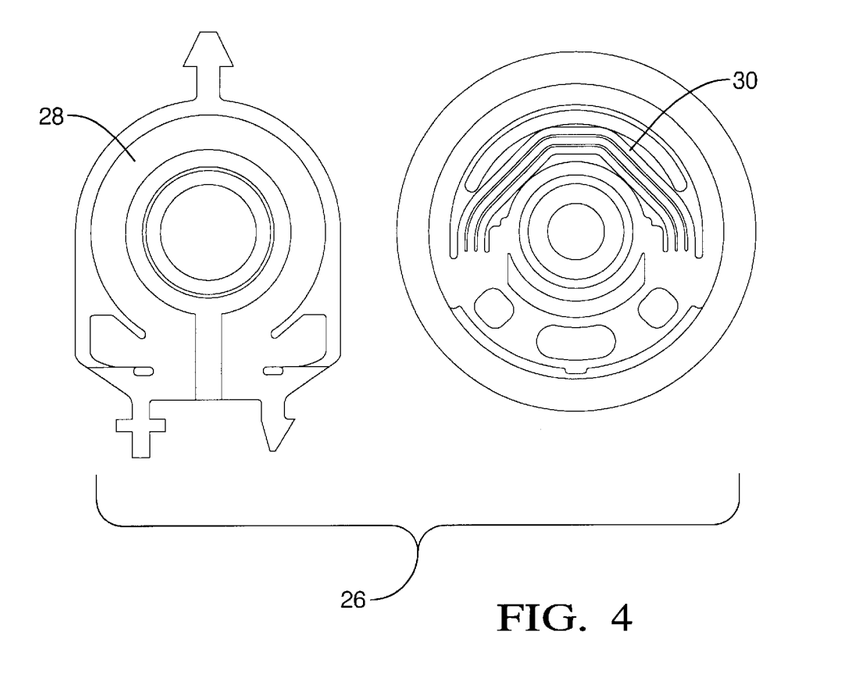
FIG. 4 is a view of the facing inner surfaces of both the wiper and the ring of the potentiometer.

Referring next to FIGS. 1 and 4, one known means for belt position detection is a potentiometer, indicated generally at 26, which consists of two basic parts, a static ring 28 (fixed to case 24) and a rotating wiper 30. Ring 28 is not a complete ring, but has a break or interruption that defines two limit positions separated by somewhat less than a full turn. (Less than a full turn because of the space inevitably subtended by the break in the ring 28.) Wiper 30 slides back and forth along ring 28, between those limit positions, and sees a varying resistance that corresponds accurately to its position on the ring 28, that is, at one of the limit positions, or in between. The wiper 30 is turned indirectly by the same motor 16 that drives belt 10, through a first reduction gear 32 that turns a final gear 34. Final gear 34 is the last turning member in the reduction gear mechanism, which could include any number of gears. The objective of the gear train or any other reduction mechanism is to translate the entire back and forth motion of belt 10, and the multiple turns of the rollers 12 and 14 necessary to achieve that, into just less than a full turn of wiper 30, so that it will correspondingly move between its limit positions on ring 28 as belt 10 moves between its left and right limit positions. Final gear 34 is shown as being coaxial with, and directly turning, wiper 30, the position of which is indicated in dotted lines. As shown in FIG. 1, belt 10 is in a mid way position between the two limit positions, as is wiper 30, as indicated by the arrows. The fact that both are in a mid position concurrently is indicative of all parts of the system being properly aligned.

Figure 2:
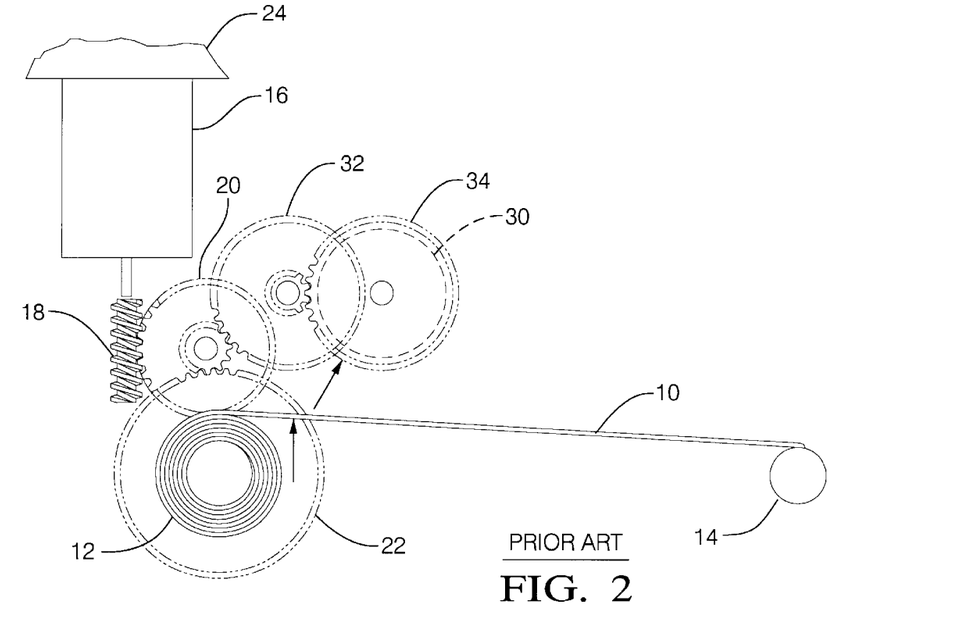
FIG. 2 is a view like FIG. 1, showing the belt at its left limit position, and the potentiometer at its corresponding limit position.
Figure 3:
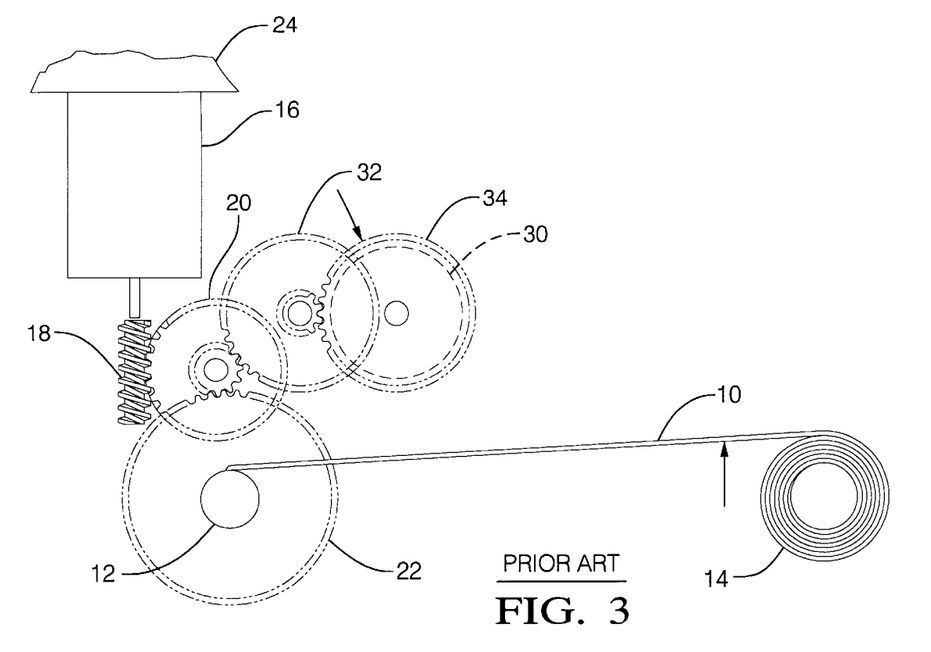
FIG. 3 is a view like FIG. 2, showing the belt at its right limit position, and the potentiometer at its corresponding limit position.

Referring next to FIGS. 2 and 3, the motion of belt 10 and a properly aligned potentiometer 26 is illustrated, as the two move to their two limit positions. In FIG. 2, belt 10 has moved all the way to it left limit position, and wiper 30 has moved to a corresponding limit position on ring 28. This is indicated by the arrow on belt 10 having moved all the way to the left, and by the arrow that represents the position of potentiometer wiper 30 having turned down. Conversely, in FIG. 3, belt 10 has moved to the right limit position, and the potentiometer wiper 30 has moved up. As long as all parts stay aligned, accurate position sensing for belt 10 is assured.

Figure 5:
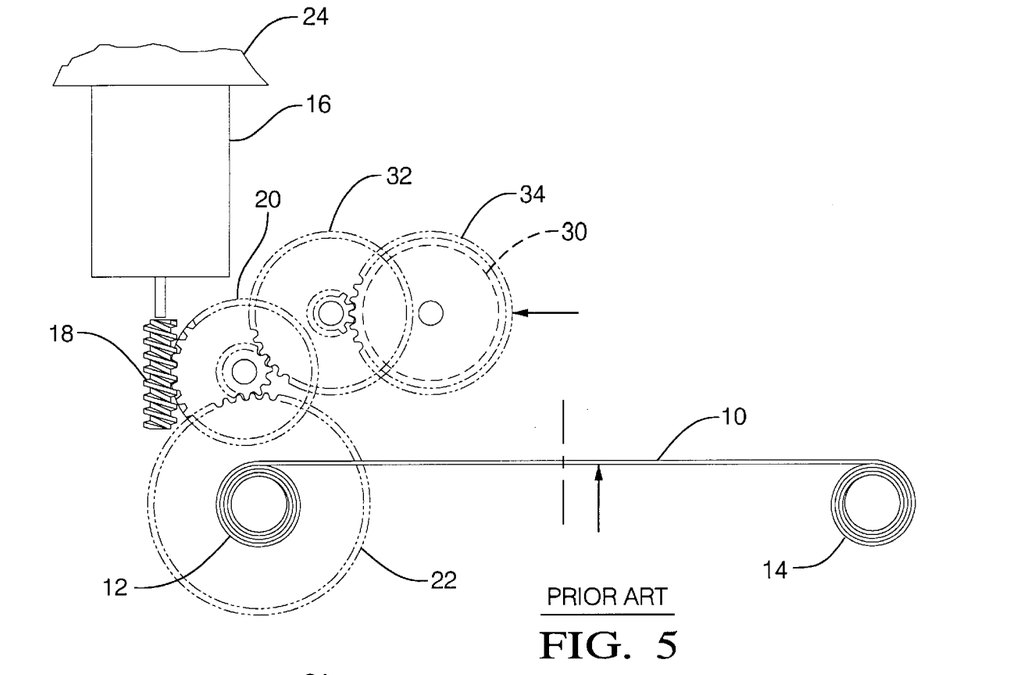
FIG. 5 is a view of the prior art film belt and potentiometer belt position indicator, showing the two misaligned, with the potentiometer approximately midway between its limit positions, but with the belt slightly to the right of its midway position, as indicated by arrows.

Referring next to FIG. 5, the fact that parts may become misaligned is illustrated. If the actuator and gear train are disassembled and reassembled inaccurately, for example, a situation can be created where the belt 10 and potentiometer 26 are not in corresponding limit positions at the same time. As shown in FIG. 5, potentiometer wiper 30 is at a midpoint, as indicated by the arrow. Because of part misalignment, however, belt 10 is shifted slightly rightward from its ideal mid position, shown by the dotted line. The position signal that potentiometer 26 would be producing at that point would be inaccurate to that extent.

Figure 6:
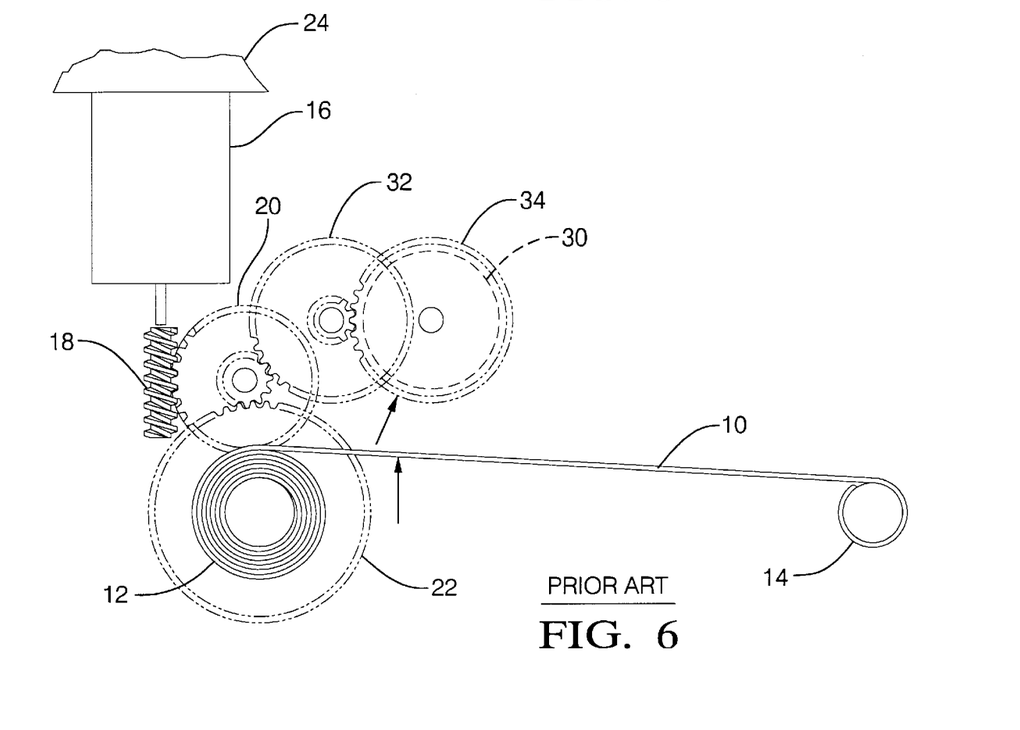
FIG. 6 shows the film belt from FIG. 5 having moved to the left, not quite to its left limit position, but with the potentiometer having already reached the limit position that should correspond to the belt left limit position.
Figure 7:
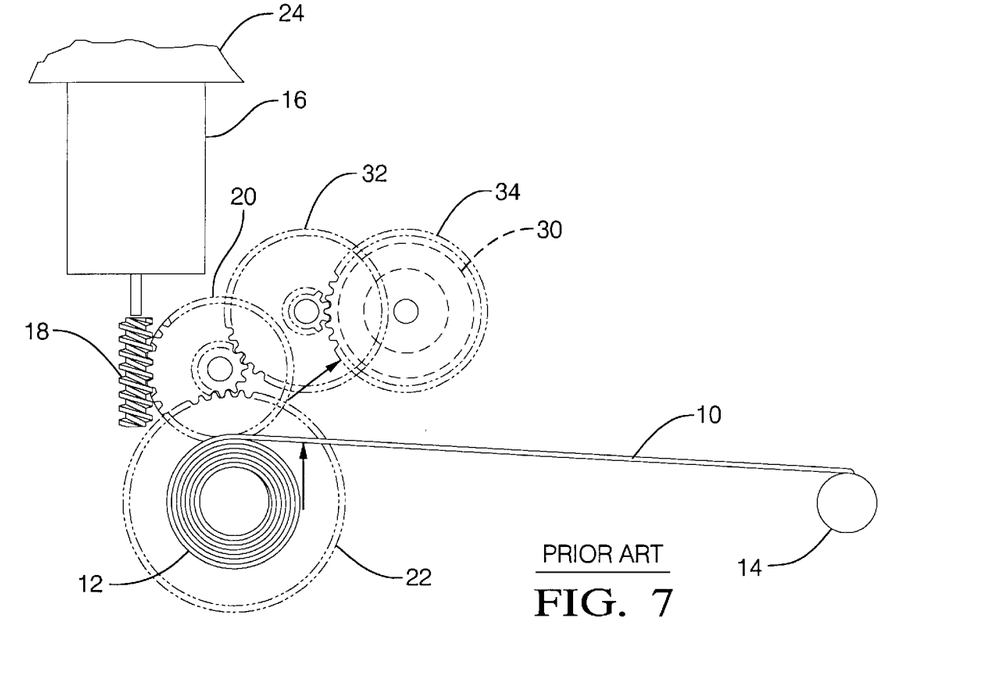
FIG. 7 shows the film belt having reached its left limit position, causing the potentiometer to have moved past its proper, corresponding limit position.

Referring next to FIGS. 6 and 7, it can be seen that the misalignment noted above continues to give inaccurate signals. If the misaligned belt 10 of FIG. 5 is shifted toward its left limit position, the potentiometer wiper 30 will reach its limit position before belt 10 does, indicating that belt 10 was at its left limit position before it actually was. When, as shown in FIG. 7, belt 10 does reach its left limit position, wiper 30 will have been turned beyond what should have been its corresponding limit position. Though not separately illustrated, if belt 10, in its misaligned condition, were driven in the opposite direction to its right limit position, the wiper 30 would move up, but not as far as what should have been its corresponding limit position.

Figure 8:
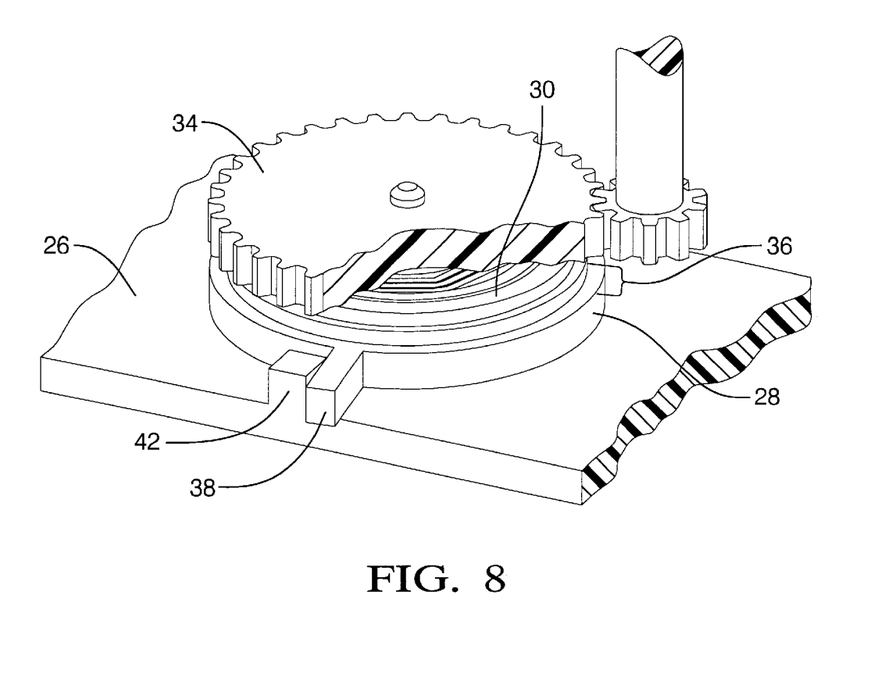
FIG. 8 is a perspective view of the potentiometer drive mechanism of the invention.
Figure 9:
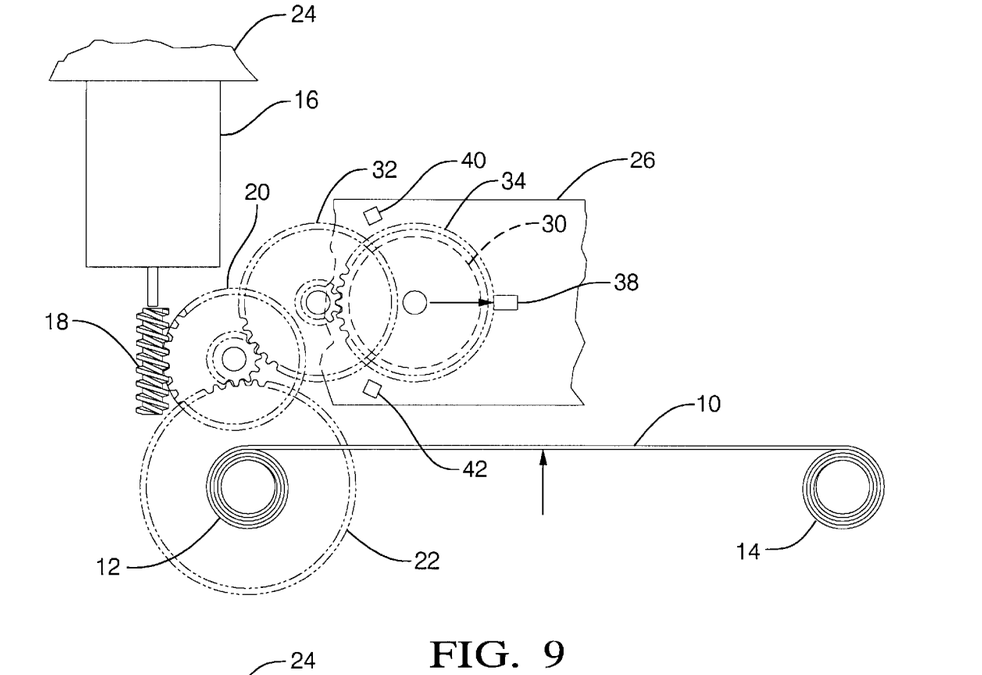
FIG. 9 is a view like FIG. 1, but showing the film belt drive and position indicator according to the invention properly aligned, in mid position, as indicated by the arrows.

Referring next to FIGS. 8 and 9, the novel potentiometer drive of the invention is illustrated. The motor, belt and various gears are the same as that described above, and given the same number. Likewise, the potentiometer wiper 30 and ring 28 would be the same, with ring 28 being fixed to case 24 in the same orientation. Now, however, wiper 30 is not directly driven by gear 34. Instead, a slip clutch, indicated generally at 36, is interposed between gear 34 and wiper 30. Clutch 36 is not illustrated in detail, but could be any suitable slip mechanism, such as a ratchet, which requires more threshold torque to cause it to slip than is necessary to turn wiper 30 normally on ring 28. In addition, a tab 38 on wiper 30 extends radially outwardly between an upper, 40, and lower, 42 hard stop fixed to case 24. The inner surfaces of the hard stops 40 and 42 generally correspond to the limit positions of the wiper 30, and more specifically, are offset therefrom sufficiently to accommodate the thickness of tab 38. That is, when, with proper alignment, the wiper 30 is in either of its limit positions, the inner surfaces of the hard stops 40 and 42 will just touch the respective outer surface of the tab 38. This is described in more detail next.

Figure 10:
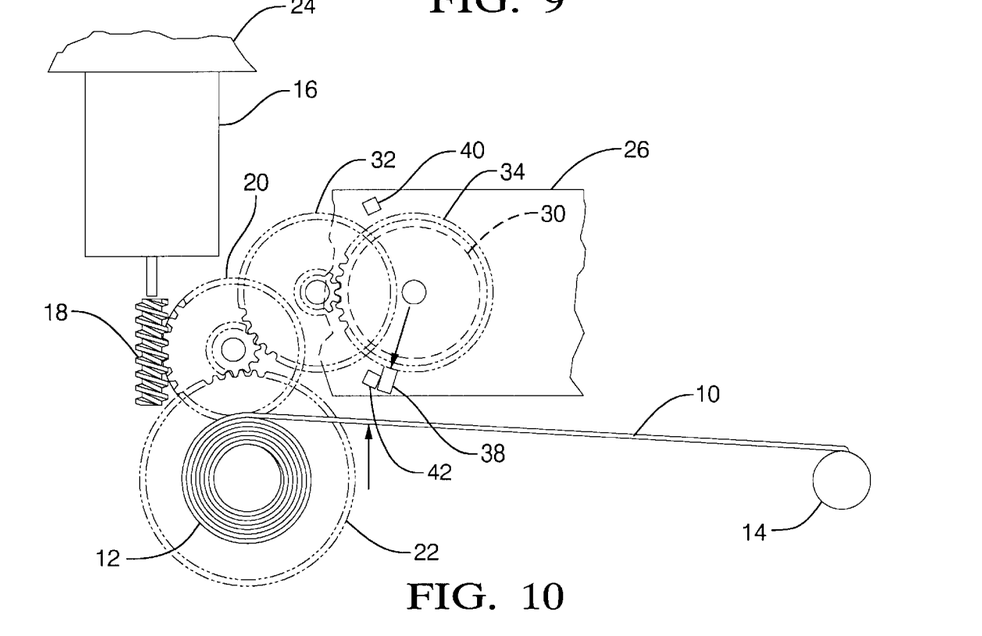
FIG. 10 is a view like FIG. 9, but showing the film belt position indicator according to the invention when the film belt is at the left limit position.
Figure 11:
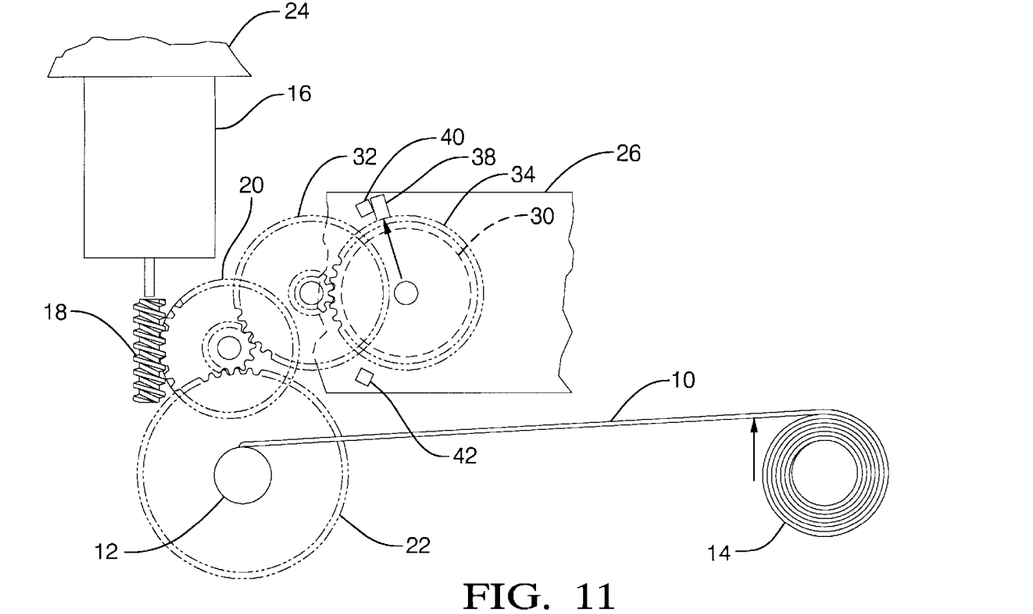
FIG. 11 is a view like FIG. 10, but showing the film belt at the right limit position.

Referring next to FIGS. 9–11, the operation of the invention when all parts are properly aligned is illustrated. As seen in FIG. 9, belt 10 is in a mid position, as is the potentiometer wiper, as indicated by the position of the center of tab 38. An arrow on gear 34 represents not the position of wiper 30 as such, but rather the starting position of gear 34/driving half of slip clutch 36 relative to potentiometer wiper 30/driven half of slip clutch 36. As seen in FIG. 10, with all parts aligned, as belt 10 reaches its left limit position, one outer surface of tab 38 just touches the inner surface of lower hard stop 42. As seen by the indicator arrow, the slip clutch 36 is not caused to slip. Conversely, as seen in FIG. 11, when belt 10 reaches its right limit position, the other outer surface of tab 38 just touches the inner surface of the upper hard stop 40, with no clutch slippage. So, with proper alignment, operation is just as it was illustrated in the prior art system.

Figure 12:
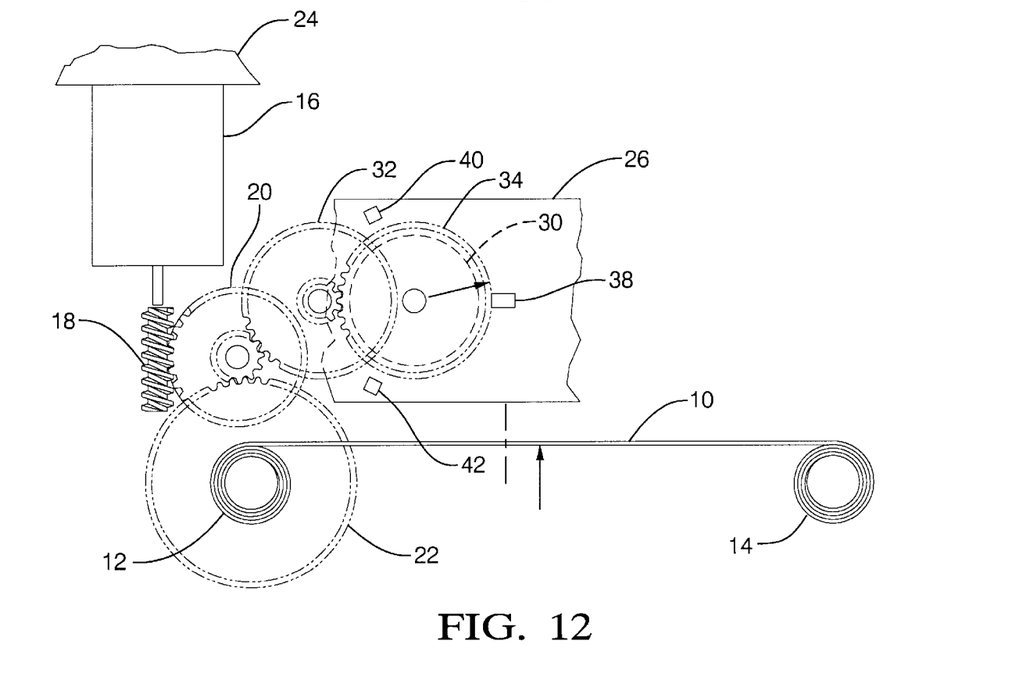
FIG. 12 is a view like FIG. 9, but showing the film belt and film belt and position indicator misaligned, with the potentiometer approximately midway its limit positions, but with the belt slightly to the right of its midway position, as indicated by arrows.
Figure 13:
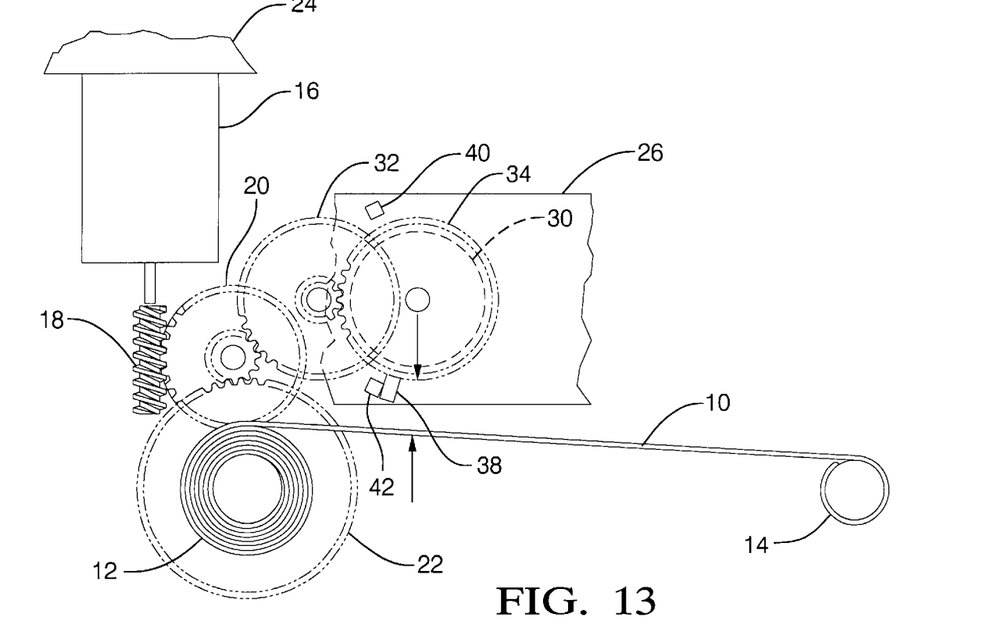
FIG. 13 shows the film belt from FIG. 12 having moved to the left, not quite to its left limit position, but with the potentiometer having already reached the limit position that should correspond to the belt left limit position.
Figure 14:
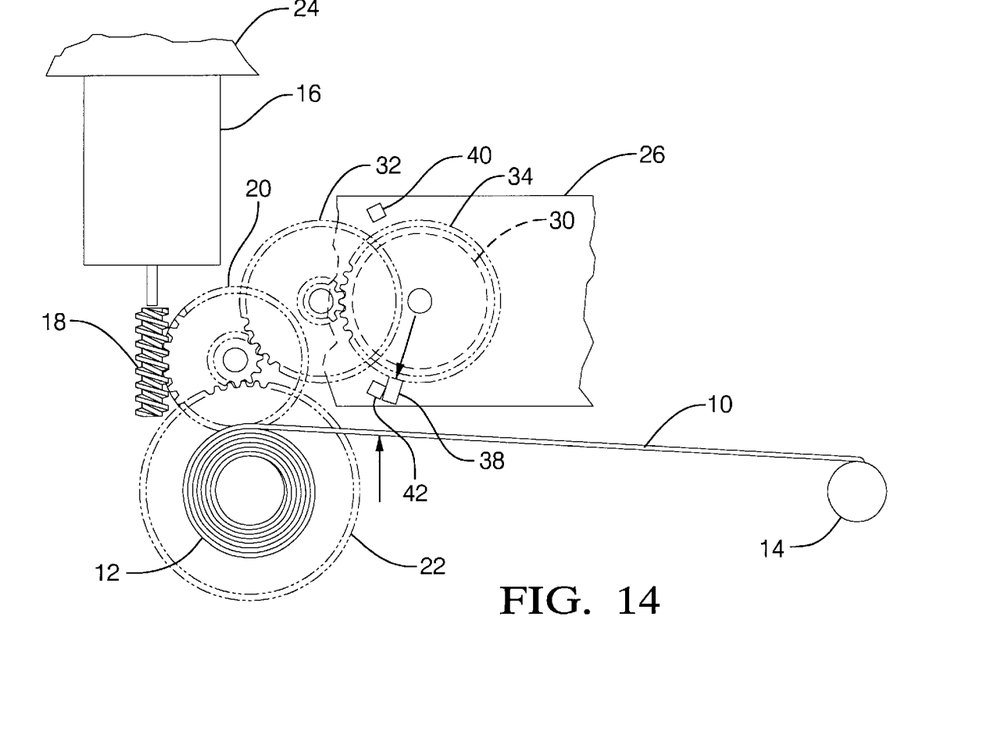
FIG. 14 shows the film belt having moved fully to the left limit position, while the potentiometer position indicator of the invention has re aligned with the belt.

Referring next to FIGS. 12 through 14, the operation of the invention when there is misalignment is illustrated. In FIG. 12, belt 10 is shown in a misaligned position equivalent to that illustrated in FIG. 5 above. That is, when the potentiometer wiper 30 is in its mid position, as indicated by the mid position of the tab 38, the belt 10 is offset slightly to the right from its mid position. As seen in FIG. 13, if belt 10 is now shifted toward its left limit position, the tab 38 will hit the lower hard stop 42 "early," that is, before belt 10 has reached its full limit position. This is the equivalent situation to that illustrated in FIG. 6 above. Unlike the prior art system, however, potentiometer wiper 30 will be prevented by this hard contact from moving farther as belt 10 moves the rest of the way to its full left limit position. Instead, as seen in FIG. 14, clutch 36 can slip relative to the now stationary wiper 30, as shown by the fact that the initial position indicator arrow moves slightly clockwise relative to the held tab 38. At this point, tab 38 and the potentiometer wiper 30 will be realigned. This is because wiper 30 has been in its limit position until the belt 10 has reached its properly corresponding limit position.

Figure 15:
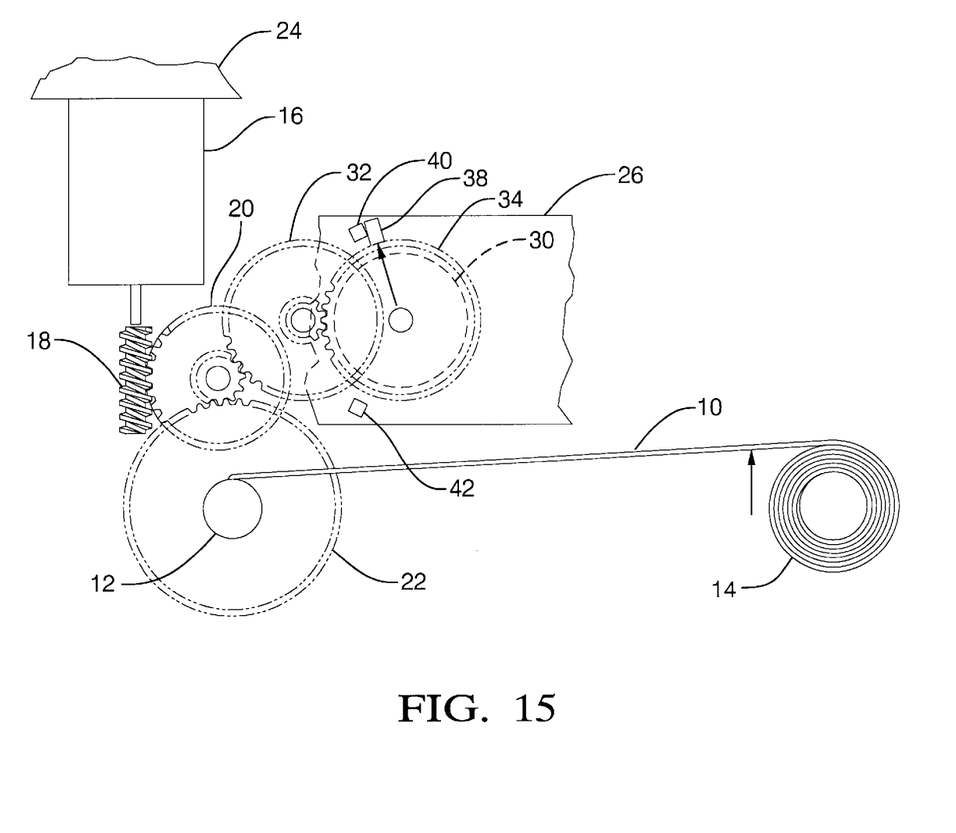
FIG. 15 is a view showing the belt having moved from the FIG. 14 position to the right limit position, as the position indicator of the invention has maintained its re alignment.

Referring next to FIG. 15, if the now realigned system is moved in the opposite direction, to take belt 10 the right limit position, the tab 38 moves counter clockwise away from the lower hard stop 42 toward the upper hard stop 40. The now unstressed slip clutch 36 maintains its shifted position relative to the wiper 30, as shown by the position of the indicator arrow relative to tab 38-wiper 30. As belt 10 reaches its right limit position, the other outer surface of tab 38 on the now realigned wiper 30 just contacts the inner surface of upper stop 40, which does not cause the clutch 36 to slip. Had the initial misalignment been in the other direction, it would have been the act of moving belt 10 to its right limit position that would have caused clutch 36 to slip and realign. Misalignment in either direction, then, can be cured by moving the belt 10 to a limit position in one direction. Since, as a practical matter, it will not likely be known in which direction the misalignment, if any, lies, it would be logical to provide that, after any re assembly, or any other action likely to cause misalignment, that the belt 10 be deliberately, or even automatically, run to both limit positions.

Variations in the preferred embodiment could be made. Most fundamentally, the scheme illustrated would work to provide passive realignment for any position indicating mechanism that had a first, fixed and a second member that turned relative to the first over substantially a full turn or less. More or fewer gears could be used in the gear train shown but, regardless, there will be a final turning member in the system, like final gear 34. The wiper 30 could be turned through another, non reducing gear that was not actually coaxial to final gear 34, if desired, for packaging purposes. The slip clutch would still be placed between that non coaxial gear and the potentiometer wiper 30 and would still, as a practical matter, be a slip clutch that was interposed between the final gear and the potentiometer wiper 30, even if it was not directly, physically sandwiched between the two. The actual position of the hard stops in any particular system would be very particular and specific to the individual application, so there could be a practical benefit to placing the hard stops on a structure that could be easily removed and replaced. The hard stops 40 and 42, once in place, would always be fixed to the case 24, however. Therefore, it will be understood that it is not intended to limit the invention to just the embodiment disclosed.

What is claimed is:

1. An alignable position indicator for a film belt drive of the type having a flexible belt that is driven back and forth between a drive and a take up roller over multiple turns between predetermined belt limit positions, comprising, a reduction mechanism that translates the multiple rotations of said drive and take up roller into substantially a single turn of a final gear in the reduction mechanism, a first, fixed member and a second, rotating member that turns relative to the first over substantially a full turn or less and which indicates the relative position of the two members, said, second, rotating member being driven by said final gear between first and second limit positions relative to said first, fixed member corresponding to respective limit positions of said belt, first and second fixed hard stops corresponding to said first and second limit positions, a solid tab on said wiper oriented so as to engage said hard stops in either direction just as said second member reaches its first and second limit positions, a slip clutch interposed between said final gear and said second, rotating member, which has a slipping threshold just higher than the torque necessary to move said second member relative to the first, whereby, if said second member becomes misaligned with said belt, motion of said belt to one of its limit positions will cause said tab to engage on of said hard stops, thereby causing said slip clutch to shift until said second member and belt are re aligned.

2. An alignable position indicator for a film belt drive of the type having a flexible belt that is driven back and forth between a drive and a take up roller over multiple turns between predetermined belt limit positions, comprising, a reduction mechanism that translates the multiple rotations of said drive and take up roller into substantially a single turn of a final gear in the reduction mechanism, a potentiometer having a fixed ring and a rotating wiper that moves on said ring, said rotating wiper being driven by said final gear between first and second limit positions on said fixed ring corresponding to respective limit positions of said belt, first and second fixed hard stops corresponding to said first and second wiper limit positions, a solid tab on said wiper oriented so as to engage said hard stops in either direction just as said wiper reaches said first and second limit positions, a slip clutch interposed between said final gear and said wiper which has a slipping threshold just higher than the torque necessary to move said wiper on said ring, whereby, if said wiper second member becomes misaligned with said belt, motion of said belt to one of its limit positions will cause said tab to engage on of said hard stops, thereby causing said slip clutch to shift until said wiper and belt are re aligned.

3. An alignable position indicator according to claim 2, wherein said potentiometer wiper and final gear are coaxial, with said slip clutch located between.

* * * * *